United States Patent [19]

Kerman

[11] Patent Number: 5,659,366
[45] Date of Patent: Aug. 19, 1997

[54] NOTIFICATION SYSTEM FOR TELEVISION RECEIVERS

[75] Inventor: Charles Walter Kerman, Mt. Laurel, N.J.

[73] Assignee: Matsushita Electric Corporation of America, Secaucus, N.J.

[21] Appl. No.: 438,387

[22] Filed: May 10, 1995

[51] Int. Cl.$^6$ .................. H04N 7/10; H04N 7/00
[52] U.S. Cl. .................. 348/460; 348/553; 348/9; 348/468
[58] Field of Search .................. 348/9, 12, 13, 348/10, 468, 466, 465, 553, 563, 564, 460

[56] References Cited

U.S. PATENT DOCUMENTS

| | | | |
|---|---|---|---|
| 4,476,488 | 10/1984 | Merrell | 348/9 |
| 4,520,392 | 5/1985 | Cox et al. | 348/468 |
| 4,605,964 | 8/1986 | Chard | 348/468 |
| 4,706,121 | 11/1987 | Young . | |
| 4,977,455 | 12/1990 | Young . | |
| 5,151,789 | 9/1992 | Young . | |
| 5,179,439 | 1/1993 | Hashimoto . | |
| 5,416,508 | 5/1995 | Sakuma | 348/506 |

FOREIGN PATENT DOCUMENTS 0 447 968   3/1991   European Pat. Off. .

OTHER PUBLICATIONS

StarSight Telecast, Inc. multi-folded advertising brochure, "In the beginning, television viewers had two choices, ON or OFF.", (1994).

StarSight Telecast, Inc. advertising literature (13 pp.), (1993).

Electronic Industries Association, "Standards Proposal No. 3191, Proposed New Standard 'Recommended Practice for Line 21 Data Service'" (Draft EIA–608), cover pages and pp. 1–115 (Jun. 24, 1993).

S. James, "New Devices for VCR Control Using Teletext Services", IEE Transactions on Consumer Electronics, vol. 38, No. 3, pp. 288–295, Aug. 1992.

*Primary Examiner*—Victor R. Kostak
*Attorney, Agent, or Firm*—Ratner & Prestia

[57] ABSTRACT

A notification system for television receivers including a visible alarm and/or an audible alarm that is activated when a certain event occurs. An information signal is extracted from a received television signal and is processed to determine the status of an event. If it is determined that the event occurred, then a control signal is sent to the appropriate alarm to activate that alarm, thereby notifying the user of the event's occurrence. The event may include the reception of a text or graphic message, the televising of a certain television program, and the televising of a television program with a specific program rating. The user may also deactivate the alarm. A personal identification number may be used to restrict access to certain features of the notification system.

18 Claims, 4 Drawing Sheets

NOTIFICATION SYSTEM FOR TELEVISION RECEIVERS

BACKGROUND OF THE INVENTION

FIELD OF THE INVENTION

This invention relates to a notification system for television receivers, and more particularly, to a visible and/or an audible alarm that is activated when a certain event occurs, such as reception of a data message or the televising of a certain program.

A television receiver is present in most homes in the United States. Many homes are connected to receive cable television signals in addition to broadcast signals while some can only receive broadcast signals. Recently, other types of service have become available such as direct broadcast satellite (DBS). In the near future, television signals may be provided to the home via telephone lines and/or direct wireless links.

Even as the amount of programming has increased, the primary source of program scheduling information is a paper listing published in a newspaper or magazine. Recently, StarSight Telecast, Inc. (SST) has introduced an Interactive Program Guide (IPG) data channel that is provided through the signal transmitted by a single television channel (e.g. in the vertical blanking interval (VBI) of the local Public Broadcasting System (PBS) affiliate). The IPG is also known as an Electronic Program Guide (EPG). The IPG data is processed by a microcomputer in the television receiver to produce an on-screen television guide that provides the viewer with information such as the upcoming television programs on all broadcast and cable channels, program plot summaries, and the name of and time remaining in each program currently being transmitted on each of the broadcast and cable channels. This information is available even if the viewer changes channels or if a commercial is being televised. The SST system is described in U.S. Pat. Nos. 4,706,121, entitled TV SCHEDULE SYSTEM AND PROCESS; 4,977,455, entitled SYSTEM AND PROCESS FOR VCR SCHEDULING; and 5,151,789, entitled SYSTEM AND METHOD FOR AUTOMATIC, UNATTENDED RECORDING OF CABLE TELEVISION PROGRAMS, which patents are hereby incorporated by reference for their teachings on microcontrollers used in a television environment and on the operation and structure of IPG systems.

In addition to SST, other competing services are currently being planned or offered. For example, each of the existing DBS systems offers an IPG service for its own programs. This IPG data may be decoded by circuitry similar to that used to decode the SST IPG except that, for DBS signals, the circuitry may reside in the DBS decoder rather than in the television receiver.

In addition to IPG systems, other systems exist which transfer data using television signals. These include Teletext, Videotex, Extended Data Services (XDS) and Closed Captioning. In each of these systems, data are transferred during the VBI of one or more television signals. All of these systems have certain hardware elements in common, circuitry which is used to extract the data from the VBI and a processor which formats the extracted data for display.

Other types of systems currently are being planned or implemented under the general heading of Interactive Television. Using these systems, message data, such as text and/or graphic messages containing communications, news, weather, and user-requested information may be sent to television receivers. These messages may be sent with a unique identifier that matches the identification code of the intended recipient (i.e. an identification code in the television receiver). Because the personal messages are sent with the identification code of the intended recipient, only he or she will be able to view the message even though it is broadcast to all local users of the system. These messages may also be sent without an identification code or with a general identifier. Messages of this type will be received by all users of the system.

A block diagram of a typical television receiver having an integrated data service in accordance with the prior art is shown in FIG. 1.

The incoming television signal is received by an antenna or a cable 100. A tuner 105, controlled by a host microcontroller 110, selects a particular channel signal and demodulates the signal to recover a baseband video signal and an audio signal. The tuner 105 receives power even when the television is turned off so that it may continue to receive and decode data from the data service.

The audio signal is passed to audio processing circuitry 115 which produces a signal for the speaker 116 when the television is turned on. The baseband video signal is passed to video processing circuitry 120 and to data decode circuitry 125. The video processing circuitry 120 includes video decode and display circuitry 121 which, in turn, includes circuitry such as a comb filter (not shown), peaking circuitry (not shown) and matrixing circuitry (not shown). The circuitry 121 separates the luminance and chrominance components of the video signal and converts the separated component signals into red (R), green (G) and blue (B) color signals. The RGB signals are applied to a video mixer 132.

The composite video signals are also applied to a scan system 123 which separates the horizontal and vertical sync components of the television signal and generates timing signals that are applied to the video decoding circuitry 121, the deflection system 134 and data decoding circuitry 125. The decoding circuitry 125 receives the baseband video signal and, responsive to the timing signals provided by the scan system, separates the data transmitted in the vertical blanking interval, stores the data for future reference and passes the decoded data to on-screen display circuitry 130. The data decoding circuitry also exchanges information with the microcontroller 110. The microcontroller 110 is used by the television receiver to implement the user controls, such as channel selection, volume, contrast, brightness, hue and color as well as to process the data received during the vertical blanking interval.

The system also includes an electronic clock 111, which may be accessed by the microcontroller 110 to determine the current time.

The information transferred by the data decoder 125 and the microcontroller 110 may, for example, be user commands requesting that specific data be displayed and signals notifying the microcontroller that particular data has been received and decoded. The same data decoder 125 may be used for multiple functions, for example, to decode IPG data for a service such as StarSight and to decode closed captioning data. The data decoding circuitry 125 is coupled to the on-screen display circuitry 130 to allow the IPG information to be formatted and displayed.

The host microcontroller 110 is also connected to the on-screen display circuitry 130 to generate on-screen menus that are used in conjunction with the control functions implemented via the microcontroller 110.

The microcontroller 110 and data decoding circuitry 125 continue to operate even when the television receiver is turned off so that they may continue to decode the IPG, Teletext or Videotex data.

The video output signals of the on-screen display circuitry 130 are applied to the video mixer 132. The mixer 132 combines the on-screen display signal with the received video signals to produce a composite display. This display may, for example, combine active video with control menu displays, add a closed caption display to a video signal or display information from the IPG in a window inset into the active video image. The combined image is displayed on a display device, such as CRT 136, under control of the deflection system 134.

A data message sent along with the IPG, Teletext, Videotex or Closed Captioning data signal may be decoded by a data decoder 125 and further processed for display by the circuitry 130.

As described above, interactive television systems may also be used to transmit personal messages which may only be viewed on a television receiver having a unique address code. For these systems, a user will be notified that a message has been received as soon as the television receiver is turned on.

SUMMARY OF THE INVENTION

The present invention provides a television receiver notification system which alerts the television owner of the occurrence of an event, such as the reception of a data message or the airing of a certain television program, through the use of a notification signal. This notification signal, or alarm, can be visible (such as the light provided by a light-emitting diode) or audible (such as a beep tone). Furthermore, the notification occurs whether the television is in its normal mode (turned on) or is in a standby mode (turned off).

A television receiver notification system in accordance with a first exemplary embodiment of the present invention includes circuitry which collects data during the vertical blanking interval (VBI) of the television signal, circuitry which extracts an information signal from the data, circuitry which determines, from the extracted data, if an event has occurred, and, if the event has occurred, activates a notification alarm.

A television receiver notification system in accordance with a second exemplary embodiment of the present invention includes circuitry which receives interactive program guide (IPG) information and which allows a user to select a predetermined television program or a list of selected television programs using the IPG information. The circuitry also includes an internal clock and circuitry which compares the clock to the selection list. If, while the television receiver is turned off, the current time is in the time interval of a program in the selection list, an alarm is activated to inform the user that one of the selected programs may be received.

A television receiver notification system in accordance with a third exemplary embodiment of the present invention also includes circuitry which allows a user to mark an undesirable television program or list of undesirable television programs using the IPG information. The television tuner and internal clock are subsequently monitored when the television receiver is turned on. If the program that is currently being received matches one of the programs on the list, then an alarm is activated.

A television receiver notification system in accordance with a fourth exemplary embodiment of the present invention includes circuitry which allows the user to provide a program rating value to the television data processing circuitry. During normal operation of the television receiver, the data processing circuitry monitors data signals being received and extracts rating codes therefrom. If the rating value of the program being televised on the selected channel is greater than the provided value, an alarm is activated.

DETAILED DESCRIPTION

In general terms, the notification system for television receivers of the present invention operates by extracting and processing an information signal from the received television signal. If, upon processing the information signal, it is determined that a targeted event has occurred, a control signal activates an alarm to indicate the occurrence of the event. In the various embodiments of the invention, the event may be the reception of a personal message, the possible reception of desired television program, the viewing of an undesirable program or the viewing of a program having undesirable characteristics.

Figure 2:
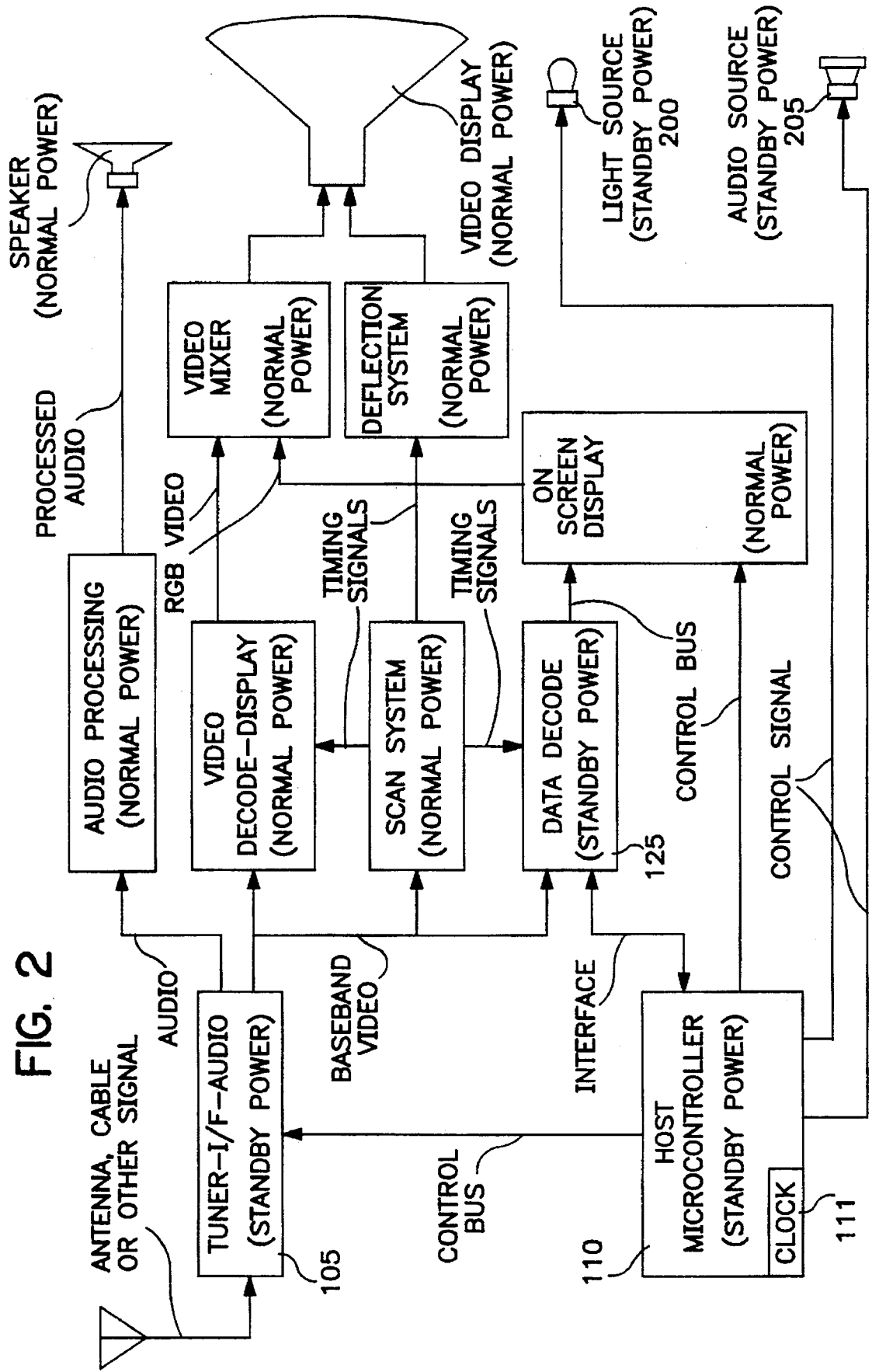
FIG. 2 is a block diagram of a television receiver integrated with a data service and a notification system in accordance with the present invention.

A block diagram of a television receiver integrated with a data service and a notification system in accordance with the present invention is shown in FIG. 2.

Figure 1:
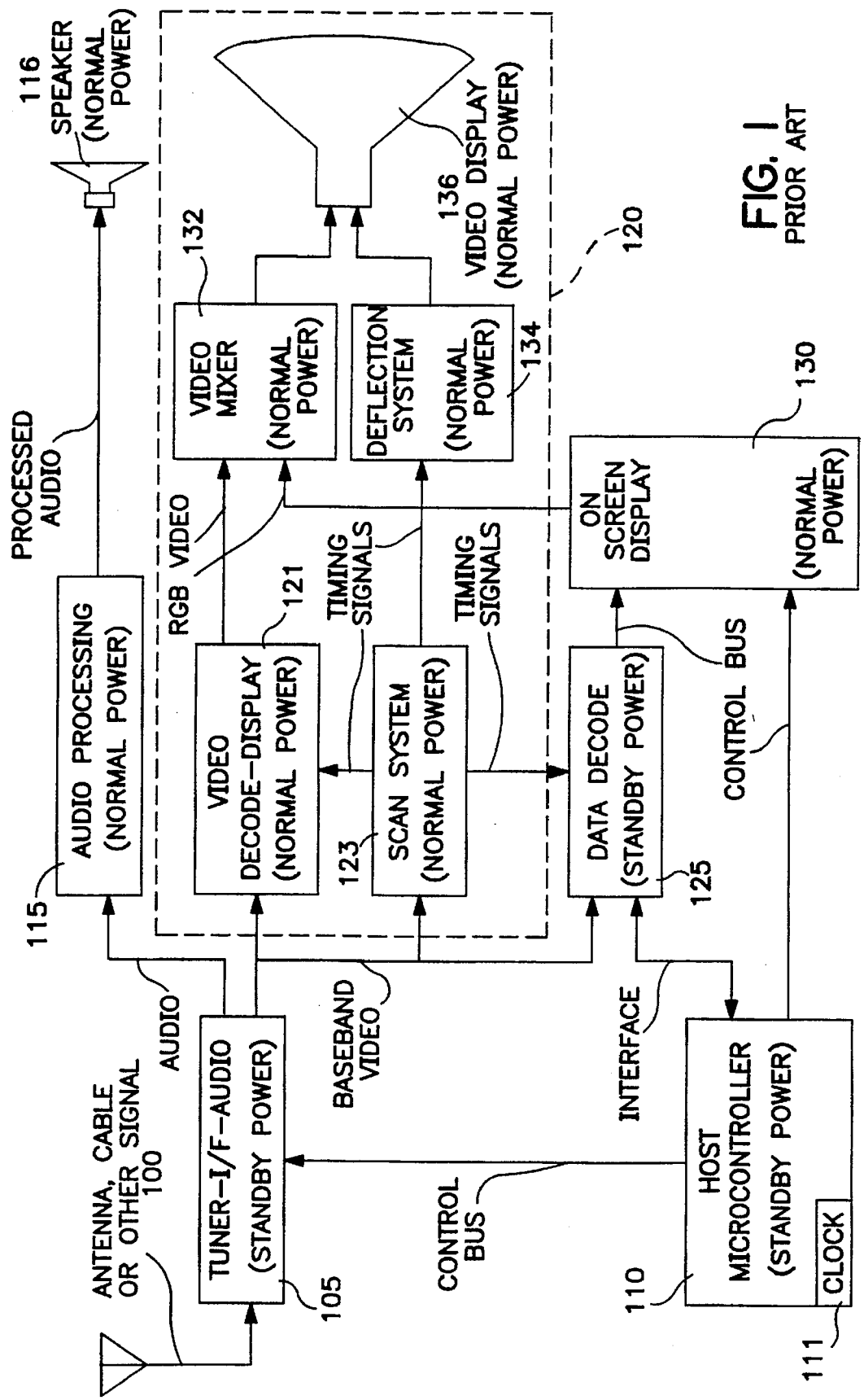
FIG. 1 (prior art) is a block diagram of a television receiver integrated with a data service in accordance with the prior art.

FIG. 2 shows the system of FIG. 1, as described above, with the addition of two alarm devices, a light source 200 and an audio source 205. Each of these sources is controlled by the host microcontroller 110. In the exemplary embodiment of the invention, the microcontroller 110 may be, for example, an MN1870 microcontroller available from Matsushita.

A typical light source 200 may be a light-emitting diode (LED) and a typical audio source 205 may be an electronic oscillator (not separately shown) and speaker (not separately shown) which produces a beep tone. In addition, the system shown in FIG. 2 includes programming in the host microcontroller 110 and data decode circuitry 125 which allows the system to recognize the occurrence of events based on the received data and, once an event has been recognized, activate the alarm device or devices as appropriate.

Initially, a television signal is received by the tuner 105 through an antenna or a cable 100 and demodulated to produce a baseband video signal. An information signal, independent from the audio and video portions of the baseband video signal, is extracted and processed by the data decoder 125. In the exemplary embodiment, this data signal is extracted from the vertical blanking interval of the video signal. It is contemplated, however, that this data signal may be extracted from a wide-band data signal transmitted in an otherwise unused television channel or from other components of a transmitted video signal, for example, a perceptually hidden subcarrier, such as a Fukinuki carrier, transmitted during the active portion of the received video signal. If the data decoder determines, from the information signal, that a particular event has occurred, the host microcontroller 110 sends a control signal to activate either the light source 200, the audio source 205 or both, to indicate the occurrence of that event. This control signal may, for example, cause the LED to blink and the audio source to emit a beep tone.

Because the tuner 105, the host microcontroller 110, the data decoder 125, the light source 200 and the audio source 205 are operable on standby power (i.e., when the television receiver is turned off), an event may be detected, and the alarms activated, even when the television receiver is not in use.

In the embodiments described below, the television receiver is assumed to have three modes, no-power, standby and normal. In no-power mode, the television is not connected to the electrical service (not plugged-in). In this mode, the standby circuitry which may be used, for example, to receive the turn-on command from the remote control and to build the IPG database or to receive information from other providers is not active. In standby mode, the television receiver is connected to the electrical service but is in a powered-off mode (plugged-in but turned off). In this mode, as described above, only those portions of the receiver which receive information from the IPG service or the other providers are active and operating at full power. In the normal mode, the receiver is connected to the electrical service and is in a powered-on mode (plugged-in and turned on). In this mode, the receiver is receiving and displaying program information. If it is not tuned to a channel which is providing information, the information databases are not updated.

The information signal may include data messages containing text and other information. As described above, the "information signal" may be IPG data, Teletext, Videotex, closed captioning data or other types of data transmitted as a part of the television signal or in a otherwise unused television channel.

Figure 3:
FIG. 3 is a data structure diagram of an exemplary data message containing various information fields, in accordance with the present invention.

FIG. 3 is a data structure diagram of an exemplary message which may be received as a part of the information signal. The exemplary data message contains various information fields, such as "Record Type", "Address", and "Message Text". The "Record Type" field may be used to distinguish a message record from other types of records that may be sent as a part of the information signal. The "Address" field may be used to direct the message to a particular user or to all users and the "Message Text" field conveys the text of the message. Other types of events, described below, may look for other types of data in the information signal to determine if an event has occurred or may examine previously stored data, for example, from an IPG, to determine if the event has occurred.

Figure 4:
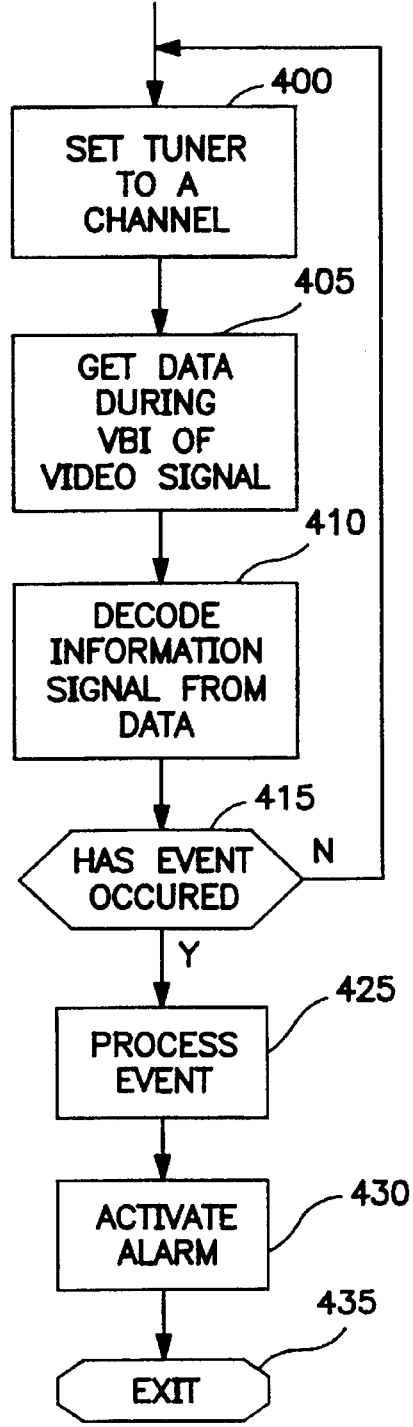
FIG. 4 is a flow-chart diagram of a television receiver notification process in accordance with a first exemplary embodiment of the present invention.

FIG. 4 is a flow-chart diagram of a process which is implemented in the microcontroller 110 of the television receiver to provide a notification system in accordance with a first exemplary embodiment of the present invention, in which the detected event is a message received as a part of the information signal.

In the process shown in FIG. 4, at step 400, the television tuner is initially set to a particular channel. If this embodiment of the present invention is to be used with the above-described SST system, the selected channel will be that which carries the SST IPG data (i.e. the local PBS affiliate). At step 405, the microcontroller 110 signals the data decode circuitry to extract the IPG data from the signal during the vertical blanking interval (VBI) of the received television signal. Next, at step 410, the microcontroller 110 signals the data decode circuitry to process any information signals that have been received during the VBI and pass these information signals to the microcontroller 110. The information signal is then processed by the microcontroller at step 415 to determine if an event has occurred.

For this first embodiment of the invention, the events are text message which are identified by their "message type" fields, as shown in FIG. 3. These messages may be initiated directly by a message delivery system such as StarSight Telecast, Inc. or by an outside authorized party such as a telephone company through the StarSight facilities or the facilities of another information provider. These text messages may contain news or weather bulletins which are for general reception or they may be personal messages addressed to a specific user. Although described above as "text" messages, it is contemplated that these messages may include graphic content or data of other types.

If the information signal does not contain a message record or if a message is received that is addressed to another user, the microcontroller, at step 415 determines that no event has occurred. When the microcontroller 110 determines that no event has occurred, the normal television process continues, with further data being retrieved and processed as set forth in steps 405, 410, and 415. In the case of an IPG, Teletext or Videotex service, the normal television process is active when the television receiver in standby mode (i.e. turned off) and in normal mode (i.e. turned on).

if, at step 415, it is determined that an event has occurred, that event is processed at step 425. This processing may include, for example, instructing the data decode circuitry 125 to continue to decode the message and then store it and to schedule a task to display the message when the television receiver is turned on. In addition, the appropriate alarm is activated at step 430 to notify the user that an event has occurred. In the exemplary embodiment of the invention, the alarm may be coupled to the microcontroller as a memory-mapped output device. In this configuration, the alarm is activated by storing a value to a memory mapped address which corresponds to the output device. This alarm may be a visible alarm, such as a blinking LED, or an audible alarm, such as a beep tone, or a combination of the two. In addition, the alarm may be programmed to be activated steadily, intermittently or in a pattern by storing different values into the memory mapped location. After the alarm is activated at step 430, no further notification system processing occurs and the process ends at step 435. In this embodiment of the invention, the alarm signal is latched such that it retains its active state until it is explicitly reset. The alarm signal is reset as part of the process (not shown) by which the message is read.

The process shown in FIG. 4 has many applications. As described above, it may be used to receive public and personal messages sent via an information service such as an IPG, XDS, Teletext or Videotex system. In addition, it may be used in a hotel environment to notify guests, on their television receivers, that they have a waiting message. Currently in some hotels, the guest is notified by a light on the telephone that a message is waiting even though that message may be viewed on the television in the room.

Another application for a system such as that described above would be for an emergency warning system. As an adjunct to, for example, the Emergency Broadcast System, an emergency message may be broadcast in the VBI of every station in a particular area, in the same manner in which XDS data are transmitted. Alternatively, if the emergency message is being broadcast over the television channel, only a message to activate the alarm is sent in the VBI. The decoding circuitry 123 in the receiver would decode the message and alert the microcontroller 110 that an emergency message has been received. Upon receiving this message, the microcontroller 110 may activate the audio source 205 and/or the light source 200 in a manner which would alert anyone within range of the television receiver that an emergency message has been received and may be viewed by turning-on the receiver. The audio alarm used by this embodiment of the invention may emit a distinctive sound, for example, it may be pulsed and/or much louder than that used in other embodiments of the invention.

Figure 5:
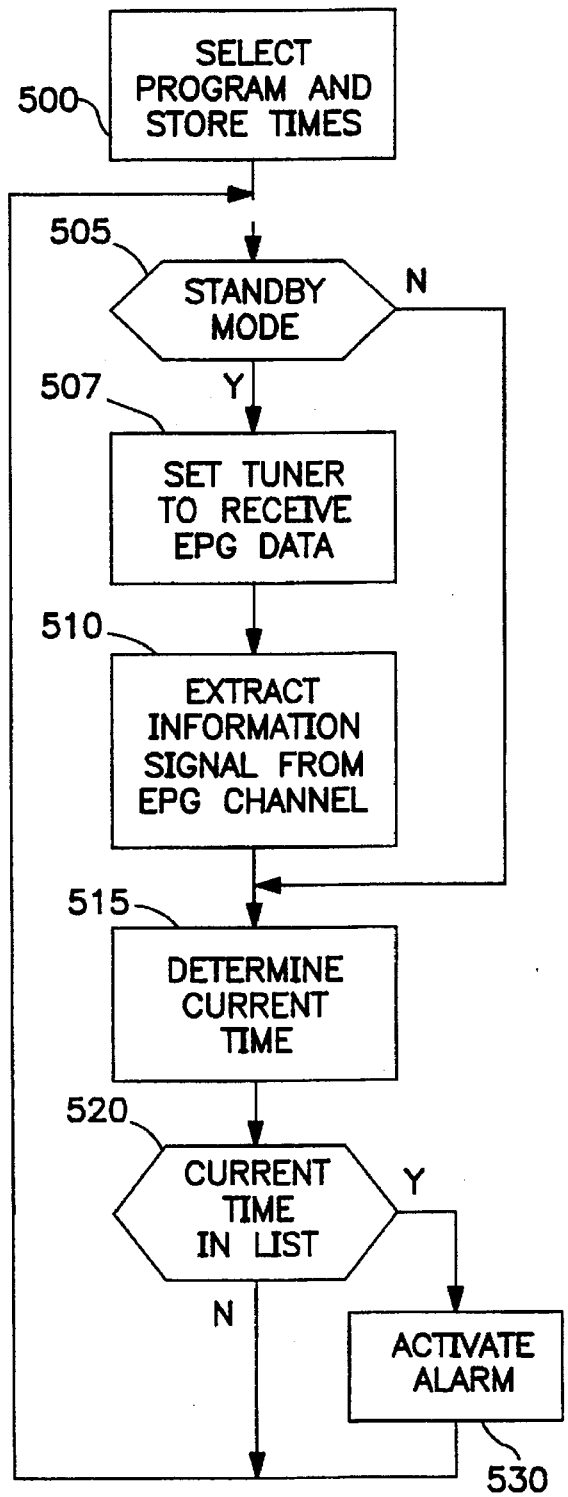
FIG. 5 is a flow-chart diagram of a television receiver notification process in accordance with a second exemplary embodiment of the present invention.

FIG. 5 is a flow-chart diagram of a process implemented in the microcontroller 110 to provide a television receiver notification system in accordance with a second exemplary embodiment of the present invention.

This process notifies a user that a previously selected program is being transmitted and is available for viewing. At step 500 of this process, the user initially selects one or more television programs from the IPG database. This selection may be made in much the same way as the StarSight system currently allows programs to be selected for recording. The selected television programs are to be televised in the upcoming days or weeks. This system notifies the user of when the program is being televised. The description below, assumes that the television receiver is in standby mode. This embodiment of the invention will operate in much the same way when the system is in normal mode.

In FIG. 5, after the program or programs have been selected by the user and registered with the system, at step 500, step 505 is executed to determine if the receiver is in standby mode. If so, at step 507, the television tuner is set to the channel on which the IPG information signal is transmitted and the IPG system, at step 510, continues to collect television scheduling application. This information may include data such as the program time and title. The collected information may be direct data in a data structure maintained by the microcontroller 110 or it may be indirect data which is represented by a list of pointers into the IPG database. After step 510 or if, at step 505, the receiver is not in standby mode, control transfers to step 515.

At step 515, the microcontroller, during the active video portion of the video signal, determines the current time and, at step 520, compares this time to the times of each of the selected programs. If it is determined at step 520 that the current time does not correspond to the times of any of the selected programs, control returns to step 505, described above.

Alternatively, if a match is found at step 520, control is transferred to step 530 at which microcontroller 110 activates the appropriate alarm. After the alarm is activated, control is returned to step 505. If the receiver is in standby mode, the notification system continues to extract information from the IPG channel at step 510 and continues the alarm activation at step 530. In this embodiment of the invention, the alarm is deactivated when the program is no longer being televised.

A deactivation feature (not shown) may also be included in the above exemplary embodiment. This feature would permit the user to deactivate the alarm after receiving notification that one of his selected programs is being televised. This feature is easily implemented as a user command to the microcontroller 110 to remove the identified program from the list or to temporarily disable the alarm device. Accordingly, no flow-chart is needed to describe the function.

Figure 6:
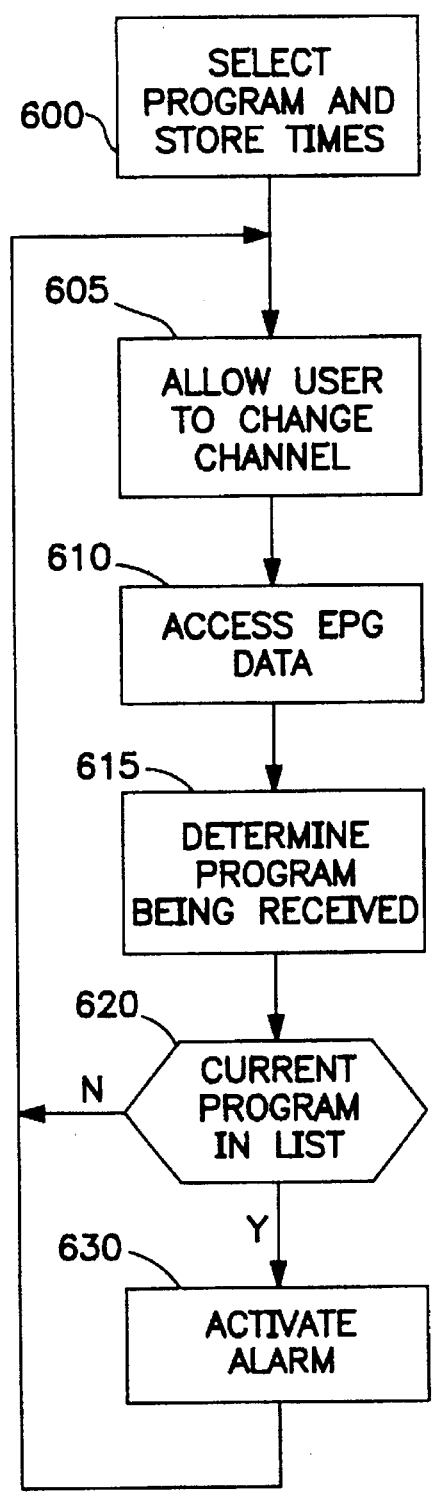
FIG. 6 is a flow-chart diagram of a television receiver notification process in accordance with a third exemplary embodiment of the present invention.

FIG. 6 is a flow-chart diagram of a process implemented in the microcontroller 110 to provide a television receiver notification system in accordance with a third exemplary embodiment of the present invention. This embodiment uses the audible alarm to indicate when a program on a list of undesirable programs is being received.

At the first step in this process, step 600, the user sets a predetermined television program or group of programs in a list, as described above with reference to the second exemplary embodiment.

The flow-chart diagram shown in FIG. 6 assumes that the IPG information has already been extracted from the information signal and is available for use. After the program or programs have been selected by the user, the television tuner may be set, at step 605, to any channel. This step is part of the normal operation of the television receiver in which the microcontroller 110 responds to user commands entered, for example, via a remote control unit.

After the channel has been selected, the IPG data is accessed at step 610 to identify the program being received via the selected channel at step 615. Step 620 then compares the identified program to the programs in the list. If the current television program matches any of the predetermined television programs at step 620, then the microcontroller 110 activates the audio alarm 205, at step 630, to alert the user that one of the selected programs is currently being televised. After the alarm is activated, control returns to step 605 to allow the user to select a new channel. If a new channel is not selected, steps 610, 615, 620 and 630 will continue to sound the alarm until a new channel is selected or until the identified program is no longer being received on the selected channel.

If, however, at step 620, there is not a match between the currently televised program and any of the programs on the list, control is transferred to step 605 to allow the user to select a new channel.

A deactivation feature (not shown) may also be included in the above exemplary embodiment. This feature would permit the user to deactivate the alarm after receiving notification that one of his selected programs is being televised. This deactivation feature is a simple command entered by the user, in the same manner as described above with reference to the second exemplary embodiment. This command may, for example, deactivate the audio source 205. It is contemplated, however, that to be effective, the disable command would require the user to enter a personal identification number (PIN) which would only be known to the particular user who entered the programs into the list.

Figure 7:
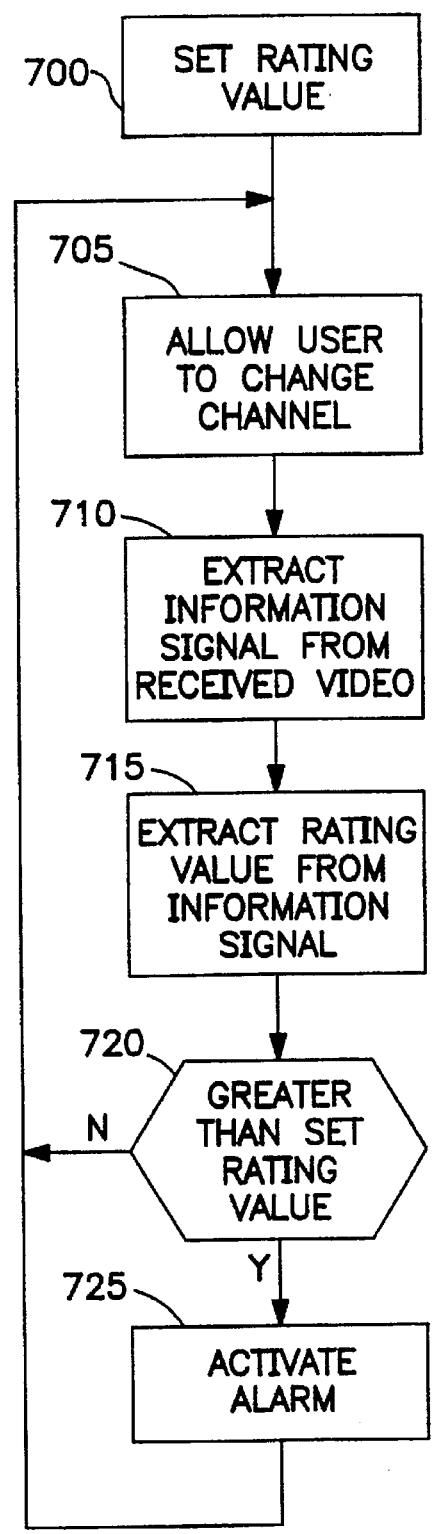
FIG. 7 is a flow-chart diagram of a television receiver notification process in accordance with a fourth exemplary embodiment of the present invention.

FIG. 7 is a flow-chart diagram of a process implemented in the microcontroller 110 to provide a television receiver notification system in accordance with a third exemplary embodiment of the present invention. This embodiment uses the audible alarm to indicate when a program having an undesirable rating value is being received.

At step 700 of this process, the user initially sets a predetermined MPAA rating value such as "PG-13" or "R". The notification system of this exemplary embodiment activates the audio alarm if a television program is selected for viewing that has a rating value higher than the user-set predetermined rating value. This embodiment is useful for a parent or guardian who would like to be alerted when a young child selects a television program which has a rating value that the parent or guardian considers to be inappropriate for the child; e.g., a movie rated "R" or "NC-17".

When the television is switched on and is in normal operating mode, the microcontroller 110, at step 705, allows the viewer to set the television tuner to a specific channel. This embodiment of the invention does not use IPG data. Instead, at step 710, the microcontroller 110 commands the data decode circuitry, at step 125, to extract an information signal from the received television signal. This information signal may, for example, be encoded data in the vertical blanking interval of a program recorded on a video tape. This data may be recorded and retrieved using circuitry and methods similar to those used to record and retrieve XDS data. It is assumed that this data includes at least an indication of the MPAA rating for the recorded program in a format that is known to the notification system shown in FIG. 2. At step 715, the microcontroller 110 extracts the rating information from the information signal.

If, at step 720, the microcontroller 110 determines that the current rating value is greater than the preset rating value, the audio alarm 205 is activated at step 725 to alert the user that an "inappropriate" television program is being viewed. The alarm continues to be active until the viewer selects another program to view (changes the channel) or until the user (e.g., parent/guardian) deactivates the alarm.

If, at step 720, the current rating value is not greater than the preset rating value, control is transferred to step 705 and the user is allowed to select another program. If another program is not selected, steps 710, 715, 720 and 725 are executed, causing the audio alarm to sound until an appropriate program is selected.

In this embodiment of the invention, it is contemplated that the command to deactivate the alarm would require the user to enter a personal identification number (PIN) in order to set the program rating value or to deactivate the alarm.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A television receiver which receives and processes a television signal to produce a video image, the television receiver comprising:
   means for receiving the television signal containing message data, the message data being independent of the video image;
   alarm means, internally coupled to the television receiver for indicating the occurrence of an event;
   an Interactive Program Guide (IPG); and
   control processor means for executing commands to operate the television receiver, including:
      means for extracting the message data from the television signal, wherein the extracting means processes data received during the vertical blanking interval of the television signal;
      means for processing the message data to determine a status of the event, including means for receiving a program rating value from an IPG service and for activating the alarm means only if the program rating value is greater than a predetermined value; and
   means for selectively activating the alarm means responsive to the determined event status.

2. A television receiver according to claim 1, wherein the event is a message transmitted during the vertical blanking interval of a predetermined channel and the alarm means is activated to indicate that the message has been received.

3. A television receiver according to claim 2, further comprising display means for displaying said received message.

4. A television receiver according to claim 2, wherein the alarm means comprises a visible alarm.

5. A television receiver according to claim 4, wherein the visible alarm is a light-emitting diode.

6. A television receiver according to claim 5, further including means for causing the light-emitting diode to blink when said alarm means is activated.

7. A television receiver according to claim 2, wherein the alarm means comprises an audible alarm which sounds when said alarm means is activated.

8. A television receiver of claim 1, further comprising means for selectively deactivating the alarm means.

9. A television receiver according to claim 1, wherein the alarm means comprises an audible alarm.

10. A television receiver which receives and processes a television signal to produce a video image, the television receiver comprising:
    means for receiving the television signal containing message data, the message data being independent of the video image;
    alarm means, internally coupled to the television receiver for indicating the occurrence of an event;
    an Interactive Program Guide (IPG) which receives and processes IPG data; and
    control processor means for executing commands to operate the television receiver, including:
       means for extracting the message data from the television signal, wherein said extracting means processes data received during the vertical blanking interval of the television signal and includes means for extracting a message data from the IPG data;
       means for processing the message data to determine a status of the event, including address processing means for extracting an address field from the message and for determining if the message is properly addressed; and
       means for selectively activating the alarm means responsive to the determined event status.

11. A television receiver according to claim 10, wherein the address processing means further includes:
    means for storing a predetermined address value; and
    means for comparing the message address value to the predetermined address value and for activating the alarm means only if the message address value equals the predetermined address value to indicate that the message has been received.

12. A television receiver which receives and processes a television signal to produce a video image, the television receiver comprising:
    means for receiving the television signal containing message data, the message data being independent of the video image;
    alarm means, internally coupled to the television receiver for indicating the occurrence of an event, wherein the event is the televising of a predetermined television program; and
    control processor means for executing commands to operate the television receiver, including:
       means for extracting the message data from the television signal which processes data received during the vertical blanking interval of the television signal;

means for processing the message data to determine status of the event, including means for comparing all programs available to be received to the predetermined program and for activating the alarm means to indicate that the predetermined television program can be received; and means for selectively activating the alarm means responsive to the determined event status.

13. A method of controlling and providing notice of an event through a television receiver comprising the steps of:

receiving a television signal including an information signal of a first type;

receiving local information including an information signal of a second type different from the first type;

processing the information signal of the first type and the second type to determine the status of the event; and activating selectively an alarm indicating the occurrence of the event if the determined status of the event indicates that the event has occurred.

14. A method according to claim 13, wherein the step of extracting message data from the television signal includes processing data received from an interactive program guide (IPG) service.

15. A notification system contained in a television receiver which receives and processes a television signal to produce a video image, the system comprising:

means for receiving the television signal including an information signal of a first type;

means for receiving local information including an information signal of a second type different from the first type;

processing means for processing the information signal of the first type and of the second type;

alarm means, internally coupled to the processing means for indicating the occurrence of an event; and means for selectively activating the alarm means responsive to processed information signals of the first type and of the second type.

16. A notification system contained in a television receiver as claimed in claim 15, wherein the processing means operates the television receiver responsive to the processed information signal of the first type and of the second type.

17. A notification system contained in a television receiver as set forth in claim 16, wherein the information signal of the second type is a predetermined rating threshold value, and the information signal of the first type is a rating value; and the processing means processes the information signal of the first type and of the second type to determine the event of the rating value being greater than the rating threshold, and activates the alarm means if it is determined that the event has occurred.

18. A notification system contained in a television receiver as set forth in claim 15, further comprising a second television signal including a predetermined television program and an information signal of a third type, the third type including a rating value; and wherein the television receiver displays the predetermined television program, the information signal of the second type is a rating threshold;

the information signal of the first type is message data received by the television receiver; and the processing means includes means for 1) processing the information signal of the first type and of the second type to determine a first event of the rating value being greater than the rating threshold, 2) processing the information signal of the first type to determine a second event of the presence of message data for the television receiver, and 3) activating the alarm means if it is determined that the event has occurred, wherein the event is deemed to have occurred if the first event or the second event has occurred.

* * * * *